United States Patent [19]

Vander Mey

[11] Patent Number: 5,793,820
[45] Date of Patent: Aug. 11, 1998

[54] AUTOMATIC ADAPTIVE FILTERING ACCORDING TO FREQUENCY MODULATION RATE

[75] Inventor: Timothy J. Vander Mey, Casselberry, Fla.

[73] Assignee: Intellon Corporation, Ocala, Fla.

[21] Appl. No.: 677,987

[22] Filed: Jul. 10, 1996

[51] Int. Cl.⁶ .................... H04B 1/10; H04B 1/69
[52] U.S. Cl. .................. 375/350; 375/200; 375/204; 364/724.19
[58] Field of Search .................... 375/200, 204, 375/350; 455/307; 364/724.19

[56] References Cited

U.S. PATENT DOCUMENTS

| | | | |
|---|---|---|---|
| 4,066,878 | 1/1978 | Miller et al. | 364/724 |
| 4,577,334 | 3/1986 | Boer et al. | 375/97 |
| 4,654,811 | 3/1987 | Jakubzick | 364/572 |
| 4,668,910 | 5/1987 | Stepp | 324/77 B |
| 4,673,982 | 6/1987 | Tam et al. | 358/167 |
| 4,694,451 | 9/1987 | Adams et al. | 370/32.1 |
| 4,726,036 | 2/1988 | Sawyer et al. | 375/14 |
| 4,792,915 | 12/1988 | Adams et al. | 364/724.19 |
| 5,090,024 | 2/1992 | Vander Mey et al. | 375/1 |
| 5,168,215 | 12/1992 | Puzzo | 24/78 F |
| 5,263,046 | 11/1993 | Vander Mey | 375/1 |
| 5,268,927 | 12/1993 | Dimos et al. | 375/1 |
| 5,278,862 | 1/1994 | Vander Mey | 375/1 |
| 5,359,625 | 10/1994 | Vander Mey et al. | 375/1 |
| 5,432,725 | 7/1995 | Bond | 364/724.19 |
| 5,440,583 | 8/1995 | Koike | 375/233 |

OTHER PUBLICATIONS

Wei et al., "Adaptive Recovery of a Chirped Signal Using the RLS Algorithm," IEEE Trans. on Signal Proc., vol. 45, No. 2 ( Feb. 1997).

*Primary Examiner*—Stephen Chin
*Assistant Examiner*—Jeffrey W. Gluck
*Attorney, Agent, or Firm*—Fish & Richardson P.C.

[57] ABSTRACT

A transversal adaptive finite impulse response (FIR) filter is modified for automatically filtering modulated signal components from a received signal based on frequency modulation rate. Coefficients of the filter are adapted to provide for filtering of signals having undesired modulation rates. The adapting operation includes selectively updating the coefficients using an error signal and iteratively decaying all the coefficients towards zero. The adaptation of the filter coefficients ensures symmetrical coefficient growth and introduces a constant group delay to the received signal to provide for filtering of complex signal components from a received signal according to frequency modulation rate without the use of a reference source.

30 Claims, 3 Drawing Sheets

AUTOMATIC ADAPTIVE FILTERING ACCORDING TO FREQUENCY MODULATION RATE

BACKGROUND OF THE INVENTION

This invention relates to adaptive finite impulse response (FIR) filters and their use in spread spectrum network communication.

Adaptive FIR filters are used in digital signal processing systems, such as, for example, network communication and spread spectrum transmission systems, to eliminate undesirable signals that may appear in a signal path of those systems.

An adaptive FIR filter is implemented using digital circuitry which suitably includes a memory for storing data, and a programmed microprocessor or microcontroller for performing arithmetic operations associated with modifying a received signal. Typically, well known least mean squares (LMS) adaptation techniques are utilized in a FIR filter for computing a desired output signal which is a filtered version of the received signal. For example, an adaptive FIR filter may be implemented for calculating a digital output signal, y(t), which would be produced from an input signal, x(t), provided at the input of the filter, according to the following LMS FIR equation:

$$y(t) = \sum_{n=0}^{N-1} h_n(t) \cdot x[t-n], \quad [1]$$

where $h_n(t)$ is an estimate of the desired filtering to be applied to the input signal x(t), n represents the nth FIR filter coefficient or tap for a time t and N is equal to total number of taps. In addition, the adaptive FIR filter calculates updated values for each of the taps of $h_n(t)$ for every input signal sample x[t] processed, according to the standard LMS update equation:

$$h_n(t+1) = h_n(t) + \delta \cdot e(t) \cdot x(t-n), \text{ for } 0 \leq n \leq N-1, \quad [2]$$

where $\delta$ is a gain scaling factor and e(t) is an error signal.

Currently, adaptive FIR filters may be utilized for filtering undesired structured signals from desired non-structured information signals. See U.S. Pat. Nos. 5,432,725 and 5,268,927, incorporated by reference herein. For example, adaptive filters may be utilized to filter low frequency modulation rate noise signals, which are generated by infant monitors or similar household electronic devices, from a signal path of a power line system when those signals are included on the signal path in combination with non-structured, high frequency modulation rate spread spectrum network communication signals. These filters, however, operate to cancel the entire received signal, including the desired signals, when the undesired slowly modulated signals are not present in the signal path in combination with the desired signals. Further, these adaptive FIR filters and other similar FIR filters do not adequately separate desired structured information signals from undesired structured signals when both are present in a received signal.

SUMMARY OF THE INVENTION

The invention is directed to automatically filtering undesired signals from a received signal according to frequency modulation rate. Unlike conventional filters that discriminate on the basis of frequency, the invention is capable of discriminating between signals sharing the same frequency components but differing in modulation rate.

In one aspect of the invention, an adaptive filter automatically filters signals having undesired frequency modulation rates from a received signal, and avoids substantial cancellation of desired modulated signals when the undesired modulated signals are not present in the received signal.

In a further aspect of the invention, a transversal automatically adaptive finite impulse response (FIR) filter performs logical and arithmetic operations on data obtained from processing of a received signal to provide that signals having desired frequency modulation rates are passed in substantially unattenuated form and that any signal having an undesired frequency modulation rate is substantially attenuated.

In another aspect of the invention, an adaptive FIR filter filters low frequency modulation rate signals, such as a continuous wave or noise signals, from spread spectrum network communication signals.

In preferred embodiments of the invention, an automatically adaptive FIR filter includes a plurality of tap coefficients and is provided with data samples of a received signal. The received signal includes signal components having desired and, in some circumstances, undesired frequency modulation rates. The filter multiplies data samples of symmetrical data pairs of a group of data samples of the received signal with respective tap coefficients, and then computes the sum of these products. An error signal is computed by summing the center datum for the group of samples with the computed sum of the products for the group. The error signal generated for each group of samples is utilized for updating a coefficient of the filter when each of the data samples of the symmetrical data pair that was multiplied with the respective coefficient has the same adaptation direction. The coefficients are continuously decayed towards zero as error signals are iteratively computed for additional groups of data samples. The updating and decaying operations adapt the coefficients to values that pass the signals having desired frequency modulation rates and filter signals having undesired rates. The center datum of a group of data samples is not multiplied with a coefficient to prevent the coefficients from converging to values that may cause complete cancellation of the received signal, regardless of frequency or frequency modulation rate.

In other preferred embodiments of the invention, the FIR filter operates in a power line transmission system for automatically filtering undesired structured low frequency modulation rate signals from a spread spectrum signal.

In still other preferred embodiments, the FIR filter adaptively updates and decays its coefficients for automatically removing wide band noise, if any, from slowly modulated signals.

Further features and advantages of the present invention will be apparent from the following description of preferred embodiments and from the claims.

DESCRIPTION OF PREFERRED EMBODIMENTS

Figure 1:
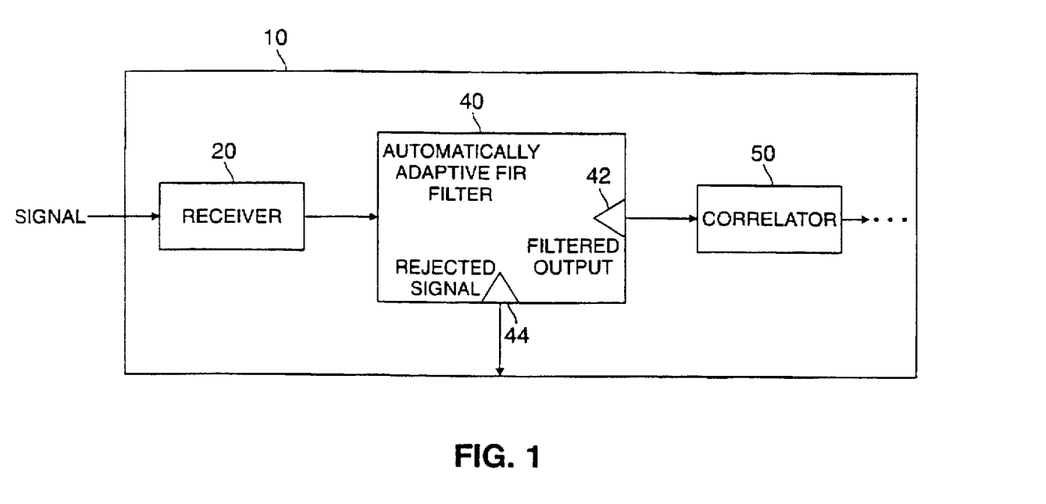
FIG. 1 shows in block diagram form a system which automatically filters a signal component from a received signal based on frequency modulation rate using an automatically adaptive transversal finite impulse response (FIR) filter.

FIG. 1 shows an exemplary spread spectrum power line transmission system 10. The system 10 includes a receiver 20 connected to a transversal automatically adaptive finite impulse response (FIR) filter 40. The filter 40 includes a filtered output port 42 that is connected to a correlator 50. The filter 40 further includes an optional rejected signal output port 44. The system 10 may operate in accordance with the CEBUS protocol, described in EIA-600.31 PL Physical Layer & Medium Specification, Rev. IS-60 (Feb. 10, 1994), incorporated by reference herein, or as part of a spread spectrum network, such as the network described in U.S. Pat. No. 5,090,024, incorporated by reference herein.

The receiver 20 is a conventional device that detects an incoming or received frequency signal x(t) and generates digitized signal samples x(n) of the received signal for routing to the filter 40.

The filter 40 is a modified, conventional FIR filter that receives the digitized samples x(n) from the receiver 20 and automatically filters signal components from the received signal based on frequency modulation rate. For purposes of illustration, the signal path of the system 10, which extends from the receiver 20 to the correlator 50, is designed for transport of highly modulated spread spectrum communication signals having a frequency modulation rate of greater than $2.9 \times 10^9$ Hz/sec. These highly modulated signals may include, for example, the spread spectrum chirp communication signals that are described in detail in U.S. Pat. No. 5,263,046, incorporated by reference herein. In particular, the filter 40 is designed to attenuate and substantially remove from the signal path of the system 10 any signal having a frequency modulation rate of less than $2.9 \times 10^9$ Hz/sec, such as, for example, a continuous wave (CW) jammer or low frequency modulation rate noise signals.

The filter 40 generates at the output port 42 an error or filtered output signal e(n) for routing to the correlator 50. The filter 40 processes the received signal to provide that the filtered output signal becomes a filtered version of the received signal which includes substantially unattenuated high frequency modulation rate signals and substantially attenuated low frequency modulation rate signals, when the latter are included in the signal path of the system 10. The correlator 50 is a conventional device which receives and processes the filtered signal to obtain information transmitted at high frequency modulation rates using the spread spectrum communication signals. In addition, the filter 40 optionally provides to the port 44 an inverse of any signal components of the signal x(n) having frequency modulation rates less than $2.9 \times 10^9$ Hz/sec and substantially attenuated higher frequency modulation rate signals.

Figure 2:
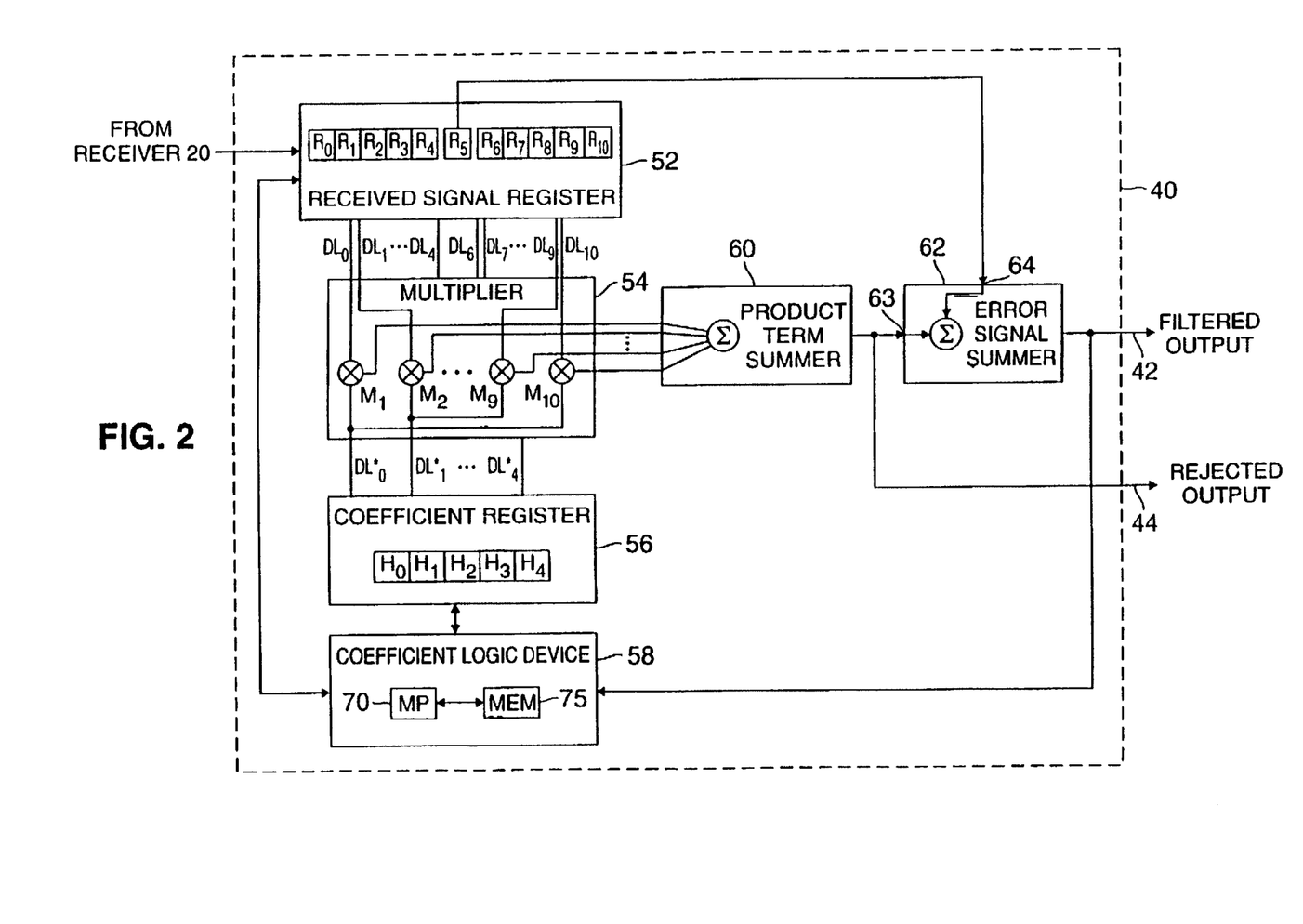
FIG. 2 illustrates an exemplary automatically adaptive transversal FIR filter including functional blocks which may suitably perform operations for automatically filtering a signal component from a received signal based on frequency modulation rate.

FIG. 2 shows an exemplary embodiment of the filter 40 as individual functional blocks. The functional blocks suitably include a received signal data sample register 52, a multiplier 54, a tap coefficient register 56, a coefficient logic device 58 comprising a standard digital signal processor or microcontroller 70 and a standard memory 75, such as a RAM, a product term summer 60 and an error signal summer 62. The functions these blocks represent may be provided through the use of either shared or dedicated hardware, including but not limited to hardware capable of executing software. The processor 70 or the memory 75 may be completely or partially external to the coefficient processor 58 or the filter 40.

For the embodiment of the filter 40 illustrated in FIG. 2, the multiplier 54 multiplies groups of data samples of a received signal stored in the register 52 by tap coefficients stored in the coefficient register 56, and the product term summer 60 sums those products. In addition, the error signal summer 62 computes an error signal δ(n) for respective nth groups of data samples by summing the product terms sum with a center datum of the respective group of data samples. The processor 70 performs arithmetic and logical operations for adapting the coefficients to provide for automatic filtering of the received signal based on frequency modulation rate. In particular, the processor 70 selectively updates the coefficients based on the error signals computed for the respective groups of data samples, and iteratively decays the coefficients towards zero. The operations performed by the functional blocks may be similarly performed using a single shared processor. Such a processor may comprise a standard digital signal processor and would include read only memory or other appropriate memory for storing software and performing the operations discussed below. Further, the filter 40 may be suitably implemented using firmware, discrete components or in an integrated circuit.

Referring again to FIG. 2, the received signal register 52 is connected to the output port of the receiver 20. The register 52 includes a plurality of N data registers $R_{0,1 \ldots N-1}$, where N is an odd number. Each of the data registers R stores a digitized data sample of a group of data samples. For purposes of illustration, the register 52 includes N=11 data registers $R_{0,1 \ldots 10}$.

The coefficient register 56 suitably includes a plurality of $$\frac{N-1}{2}$$

tap coefficient registers $$h_{0,1,\ldots,(\frac{N-1}{2})-1}.$$

The coefficient register 56 is suitably a N tap coefficient register of a conventional transversal FIR filter that is modified as follows:

$$h_i(n) = 0 \text{ for } i = \left( \frac{N-1}{2} \right)$$

and $$h_i(n) = h_{N-1-i}(n) \text{ for } i = \left( \frac{N-1}{2} \right) + 1 \ldots N-1,$$

where n represents the FIR filter coefficient or tap for a time t. In other words, the filter 40 is an N tap FIR filter that has a center coefficient equal to zero and uses individual coefficient registers h for representing identical coefficient values in order to minimize required hardware or memory space. For purpose of computational notation, the tap coefficients of the coefficient register 56 may be expressed as follows:

$$H'(n) = (h_0(n), h_1(n), \ldots h_{N-1}(n)),$$

where $h_i(n)$ is defined as above. For purposes of the illustrative embodiment, the coefficient register 56 comprises the coefficient registers $h_{0,1,2,3,4}$.

Data lines $DL_{0,1,2,3,4}$ connect the registers $R_{0,1,2,3,4}$ to multipliers $M_{1,2,3,4,5}$ of the multiplier 54 and data lines $DL_{6,7,8,9,10}$ connect the registers $R_{6,7,8,9,10}$ to multipliers $M_{6,7,8,9,10}$ of the multiplier 54, respectively. Data lines $DL^*_{0,1,2,3,4}$ connect the coefficient registers $h_{0,1,2,3,4}$ to the multipliers $M_1$ and $M_{10}$, $M_2$ and $M_9$, $M_3$ and $M_8$, $M_4$ and $M_7$ and $M_5$ and $M_6$ of the multiplier 54, respectively. These interconnections in the filter 40 provide a suitable interconnection architecture that enables the multiplier 54 to multiply data samples of symmetrical data pairs of a group of data samples of a received signal with respective tap coefficients. These processing operations are discussed in detail below in connection with FIG. 3.

Outputs of each of the multipliers M of the multiplier 54 are connected to the product term summer 60. The summer 60 includes an output port that is connected to the rejected signal port 44 and to an input port 63 of the error summer 62. The error summer 62 further includes an input port 64 that is connected to the data register $$R_{\frac{N-1}{2}}$$

that holds the center datum of the current group, or $R_5$ in the received signal register 52. The error summer 62 includes an output port that is connected to the filtered signal port 42 of the filter 40 and to the coefficient logic device 58. The coefficient logic device 58 further includes first and second data transfer ports that are connected to the coefficient register 56 and the received signal register 52, respectively.

Figure 3:
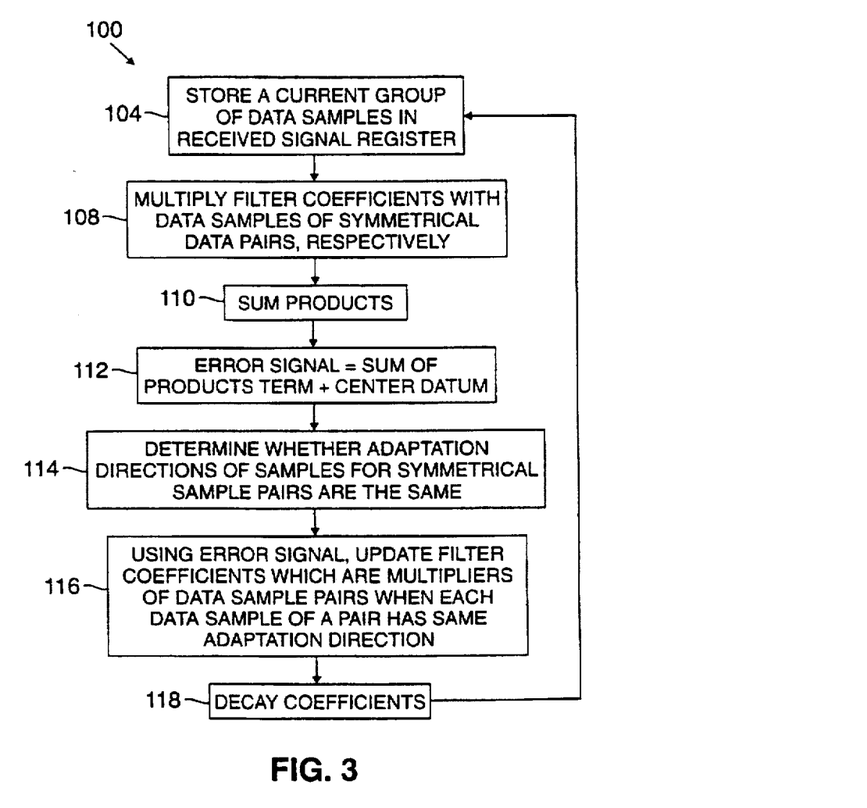
FIG. 3 is a flow diagram of a method for filtering modulated signal components from a received signal based on frequency modulation rate using the FIR filter of FIG. 2.

FIG. 3 shows steps of a process 100 that the filter 40 may perform for automatically filtering from the signal path of the system 10 any slowly modulated signals that may be included in combination with highly modulated spread spectrum communication signals. For purposes of highlighting the features of the filter 40, the receiver 20 receives a signal x(t), which includes highly modulated spread spectrum communication signals as well as low frequency modulation rate noise signals, and supplies digitized data samples x(n) of the received signal to the register 52.

Referring to FIGS. 2 and 3, in step 104, the register 52 receives the data samples x(n) from the receiver 20 and stores in the data registers $R_{0,1 \ldots 10}$ a current group X(n) of the N most recent data samples, where:

$$X(n) = (x(n), x(n-1), \ldots x(n+1-N)).$$

For purposes of illustrating the process 100, a (n+1)th group of data samples x[30] to x[20] is currently stored in the registers $R_{0,1 \ldots 10}$, respectively, such that the sample x[25] is the center datum of the group.

In step 108, the multiplier 54 multiplies selected data samples of the group stored in the register 52 with the coefficients stored in the coefficient register 56. In particular, each tap coefficient of the filter 40 is multiplied with the respective data samples of data pairs of the current group stored in the register 52 which are symmetrical about the center datum of the group. The center datum of a group of samples currently stored in the register 52 is not multiplied by a coefficient of the filter 40. The symmetrical data pairs in the register 52 are formed by the data samples in the registers $R_0$ and $R_{10}$, the registers $R_1$ and $R_9$, and so forth. For the filter 40 illustrated in FIG. 2, the multiplier 54 multiplies the data samples in the registers $R_{0,1,2,3,4}$ and $R_{6,7,8,9,10}$ with the coefficients stored in the coefficient registers $h_{0,1,2,3,4}$, respectively. For example, the multiplier 54 computes the product of the value stored in $R_0$, namely x[30], and the coefficient $h_0(n)$ at the multiplier $M_1$ and the product of the value stored in $R_{10}$, namely x[20], and the coefficient $h_0(n)$ at the multiplier $M_{10}$. Similarly, the multiplier 54 computes the product of the value stored in $R_1$, x[29], and the coefficient value $h_1(n)$ at the multiplier $M_2$ and the product of the value stored in $R_9$, x[21], and the coefficient $h_1(n)$ at the multiplier $M_9$, and so forth.

In step 110, the summer 60 computes the sum of the product terms generated at the multiplier 54 in step 108 for the current group of data samples according to the equation:

$$y(n) = H^T X = X^T H = \sum_{i=0}^{N-1} h_i(n) \cdot x(n-i). \quad [3]$$

Further in step 110, the summer 60 routes the sum of the product terms to the input port 63 of the summer 62 and to the rejected signal port 44. After several iterations of the process 100 for several groups of data samples of the received signal, the sum of the product terms y(n) would approach and converge to a value equal to the inverse of the slowly modulated signals that are included in combination with the highly modulated spread spectrum communication signals in the signal path of the system 10.

In step 112, the error signal summer 62 computes an error signal $\delta(n+1)$ for the (n+1)th group of data samples, where $$\epsilon(n+1) = x\left(\frac{N-1}{2}\right) + H^T(n) \cdot X(n+1), \quad [4]$$

by summing the value of the center datum, x[25], of the current group that is detected at the input port 64 and the value received at the input port 63. The error summer 62 then routes the computed error signal to the filter output signal port 42 and to the input port of the coefficient logic device 58. Further, the processor 70 suitably stores data representative of the computed error signal in the memory 75.

In step 114, the processor 70 suitably detects at the second data transfer port the values of the data samples currently stored in the register 52. Further, the processor 70 determines, for each symmetrical sample pair of the current group, whether the adaptation directions of the data samples for each of the sample pairs, respectively, are the same. In particular, the processor 70 compares the polarities or signs of the data samples of a pair and determines that the adaptation directions of the data samples of the pair are the same when the signs of the data samples of the pair are equal. Further in step 114, the processor 70 suitably stores in the memory 75 data indicating those symmetrical pairs of data samples in the current group of samples, if any, that include data samples having the same adaptation directions. For purposes of illustration, in step 114, the processor 70 computes and stores in the memory 75 coefficient adjustment values:

$$adj_i(n+1) = I\{sign(x(n+i+1)) = sign(x(n+N-i+1))\} \quad [5]$$

$$\text{for } i = 0, 1, \ldots, \left(\frac{N-1}{2}\right) - 1$$

where I[X] is the indicator function of the event X, for indicating whether the adaptation directions are the same for data samples in the symmetrical sample pairs in the (n+1)th group of samples, where $adj_i(n+1)=1$ when the signs of the data samples of a pair are equal and $adj_i(n+1)=0$ when the signs are not equal.

In step 116, the processor 70 performs operations for updating the coefficients of the filter 40 utilizing the error signal computed in step 112 and the results of the adaptation direction determinations performed in step 114. A coefficient $h_i(n)$ of the filter 40 is updated only if each of the data samples of a symmetrical sample pair that was multiplied with the respective coefficient has the same adaptation direction. In other words, a coefficient that is multiplied with the data samples of a symmetrical pair is updated only when the adaptation direction for each of the data samples of the symmetrical pair is the same. In one of the preferred embodiments, the processor 70 computes the following update terms:

$$U_i(n+1) = \delta x_i(n+1)e(n+1), \text{ for } i = 0, 1 \ldots \left(\frac{N-1}{2}\right) - 1 \quad [6]$$

for the coefficients $h_i(n)$ that have been indicated for updating in step 114 and then sums these update terms with the respective coefficients $h_i(n)$. $\delta$ is a gain constant that is stored in the memory 75 and suitably set equal to a value that causes the processor 70 to adapt the coefficients for filtering slowly modulated signals from the signal path of the system 10 and for passing highly modulated signals to the filter output 42 in substantially unattenuated form. Further, the processor 70 stores in the memory 75 data representative of the values of the updated coefficients. The selective updating of the coefficients of the filter 40 according to whether the adaptation directions of the data samples of the symmetrical pairs are the same adapts the coefficients in a manner that is compatible with symmetrical coefficient growth and ensures that only a constant group delay is introduced to the received signal.

In one preferred embodiment, the processor 70 may perform operations associated with the well known Sign-Sign LMS algorithm for implementing steps 114 and 116 of the process 100. An exemplary method for implementing the Sign-Sign LMS algorithm, in which filter coefficients are updated depending on the sign of the error signal and the signs of the data samples, is discussed in detail below in connection with FIG. 4A. Alternatively, the processor 70 may implement steps 114 and 116 of the process 100 for updating coefficients of the filter 40 by performing operations associated with a Data-Sign algorithm, an Error Sign algorithm, a Standard LMS algorithm or a Normalized LMS algorithm.

Referring again to FIG. 3, in step 118, the processor 70 performs operations on the coefficients of the filter 40 to cause the values of the coefficients to decay gradually towards zero as groups of data samples are iteratively processed at the filter 40. In particular, the processor 70 decays the coefficients $h_i(n)$ by subtracting decay terms $\gamma h_i(n)$, respectively, therefrom for each group of data samples processed. $\gamma$ is a decay constant that is stored in the memory 75 and is suitably set equal to a value that causes the processor 70 to adapt the coefficients for filtering slowly modulated signals from the signal path of the system 10 and passing highly modulated signals to the filter output 42 in substantially unattenuated form. The adaptations that the processor 70 performs on coefficients $h_i(n)$ of the filter 40 for the (n+1)th group of data samples, in accordance with the steps 116 and 118 of the process 100, may be expressed in terms of the following coefficient adaptation equation:

$$h_i(n+1) = h_i(n) + \delta x_i(n+1)e(n+1)adj_i(n+1) - \gamma(h_i(n)), \quad [7]$$

$$\text{for } i = 0 \ldots, \left(\frac{N-1}{2}\right) - 1.$$

Preferably, in step 118, the processor 70 generates adapted coefficients values by retrieving from the memory 75 data representative of the updating performed in step 116 and suitably processing that data with data representative of the decay being applied to the coefficients. The processor 70 then routes the adapted coefficient values from the first data transfer port to the coefficient register 56 for suitably replacing the coefficients stored in the coefficient registers $h_{0,1,2,3,4}$ with the respective adapted coefficient values. After step 118, the process 100 is executed repeatedly for subsequent groups of data samples that are provided to the filter 40.

After the process 100 is executed for a suitable number of groups of data samples, the filter 40 would adapt the coefficients accordingly for substantially removing from the signal path of the system 10 any low frequency modulation rate signals that are included in combination with the high frequency modulation rate spread spectrum communication signals. In other words, the processor 70 adapts the coefficients of the filter 40 to cause the error signal generated at the error summer 62 to become a filtered version of the received signal. That error signal, in turn, is routed to the filtered output 42 and represents the filtered output signal of the filter 40.

It is noted that the values for $\delta$ and $\gamma$ that are stored in the memory 75 control the updating and decaying operations that the processor 70 performs for adapting the coefficients. In particular, these variables control the processing of data samples by the filter 40 to provide for automatic filtering of slowly modulated signals that may appear in combination with a highly modulated communication signal. For example, the suitable selection of those values causes the filter 40 to substantially pass and not attenuate a highly modulated signal in a received signal. In operation, the filter 40 would attempt to adapt its coefficients to a current or first frequency of the high frequency modulation rate signal. As the coefficients begin to adapt to the first frequency, however, the high modulation rate signal would have changed to a different or second frequency. At that time, the coefficients that were adapted to cancel the first frequency of the highly modulated signal would have begun to decay as a new filter coefficient profile emerges. Thus, when the high modulation rate signal returns to the first frequency, the coefficients have lost all "memory" of that signal and must seek to readapt to it. Hence, the filter 40 would pass the highly modulated signal to the filter output 42 in substantially unattenuated form.

In contrast, the same filter 40 would successfully adapt its coefficients to the current frequency of a low frequency modulation rate signal and substantially remove that signal from the signal path because its current frequency does not change so rapidly to prevent the coefficients from adapting to a coefficient profile for cancelling that signal. As a result, a slowly frequency modulated signal would be effectively removed from the signal path of the system 10 by the filter 40 and appear only in substantially attenuated form, if at all, at the filter output 42.

Referring to equation [7], it is to be understood that a filter similar to the filter 40 may be designed to attenuate or remove specific signal components from a received signal according to frequency modulation rate by suitably varying the gain $\delta$, the decay $\gamma$, the filter length N or the data sample rate. For example, the gain $\delta$ may be suitably set to relatively large values for obtaining a filter whose coefficients quickly converge to values that would cause filtering of slowly modulated signals. Alternatively, the decay $\gamma$ may be suitably set to relatively large values for lowering the frequency modulation rate cutoff of the filter, in other words, providing a filter that passes signals having lower frequency modulation rates. In addition, the number of taps N or filter length may suitably be increased for increasing the operable cutoff of the filter.

Figure 4A:
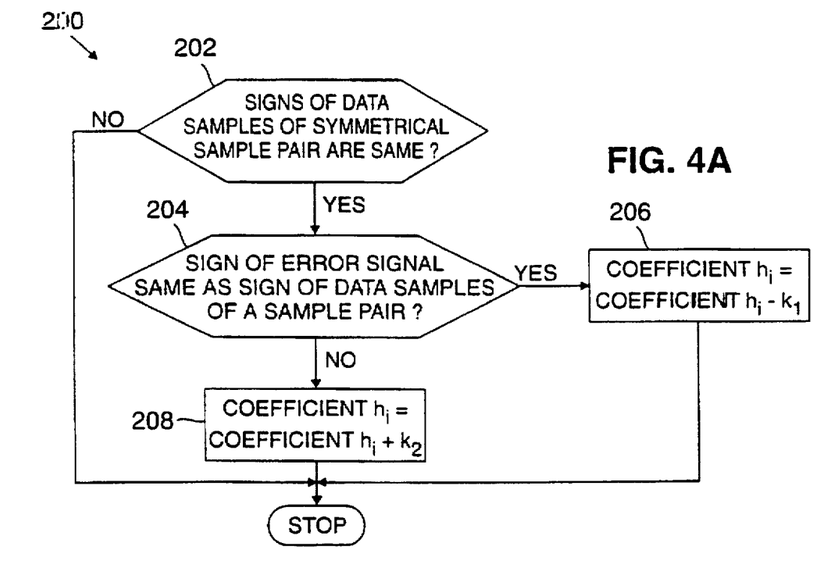
FIG. 4A is a flow diagram of an exemplary method of updating the coefficients of the FIR filter of FIG. 2 using a least means square (LMS) Sign-Sign algorithm.

FIG. 4A shows steps of an exemplary process 200 that the processor 70 of the filter 40 may suitably perform in some embodiments for executing steps 114 and 116 of the process 100 in accordance with a Sign-Sign LMS algorithm. For purposes of brevity, the process 200 is illustrated for updating the tap coefficient stored in the register $h_0$ of the coefficient register 56. In a typical implementation of the filter 40, the processor 70 performs similar operations for updating all tap coefficients stored in the register 56 for each group of data samples processed.

Referring to FIG. 4A, in step 202, the processor 70 determines, for the data samples of the current group, whether the signs of the values of the symmetrical data sample pair stored in the registers $R_0$ and $R_{10}$ are the same. If yes, in step 204, the processor 70 determines whether the sign of the error signal obtained in step 112 of the process 100 is the same as the signs of the data samples of the symmetrical pair stored in the registers $R_0$ and $R_{10}$. If yes, in step 206, the processor 70 decrements the value of the coefficient ho by a constant $k_1$. If the signs are not the same in step 204, then in step 208, the processor 70 increments the value of the coefficient $h_0$ by a constant $k_2$. The processor 70 suitably stores the new value for $h_0$ in the memory 75 to allow for retrieval in accordance with step 118 of the process 100. It is noted that the gain that is applied to the coefficients is controlled by the magnitude of the decrement and increment constants $k_1$ and $k_2$, respectively.

Figure 4B:
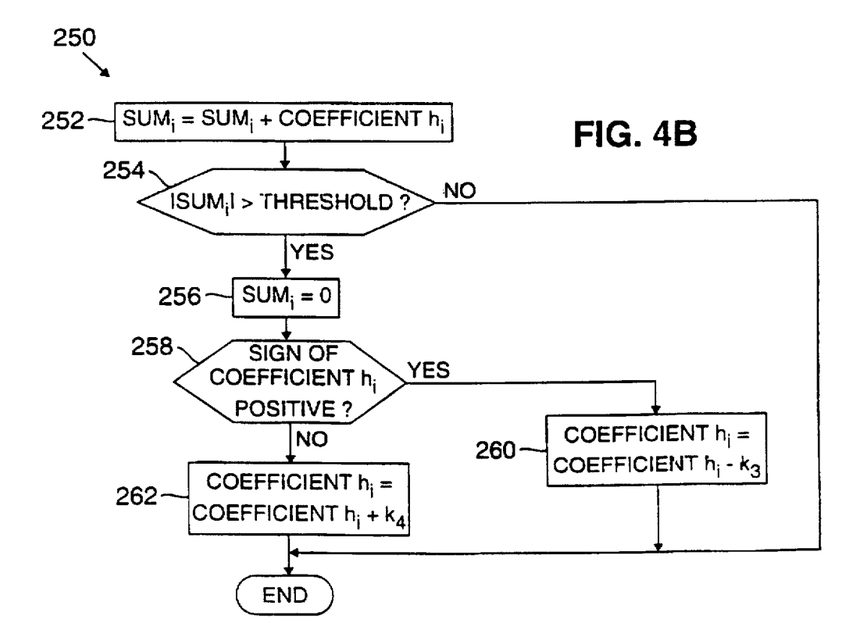
FIG. 4B is a flow diagram of an exemplary method of gradually and continuously decaying coefficients of the FIR filter of FIG. 2 towards zero.

FIG. 4B shows steps of a process 250 that the processor 70 may suitably perform in some embodiments for attempting to decay the coefficients $h_i$ of the filter 40 towards zero in accordance with step 118 of the process 100. For purposes of brevity, the process 250 is illustrated for decaying the tap coefficient stored in the register $h_0$ of the coefficient register 56. In a typical implementation of the filter 40, the processor 70 performs similar operations for decaying all tap coefficients stored in the register 56.

Referring to FIG. 4B, in step 252, the processor 70 computes the sum of the value of the coefficient $h_0$ and the value of corresponding accumulator variable $SUM_0$, and then stores in the memory 75 the computed sum in $SUM_0$. The variable $SUM_i$ is utilized for controlling the decay rate applied to the coefficient $h_0$ of the filter 40. In step 254, the processor 70 determines whether the magnitude of the accumulator variable $SUM_0$ exceeds a predetermined threshold TH. The threshold TH controls the proportional decay rate of the coefficient $h_0$. If the condition in step 254 is false, no further action is taken for this iteration. If the condition in step 254 is true for the coefficient $h_0$, in step 256, the processor 70 sets the corresponding value of $SUM_0$ in the memory 75 equal to zero. Then in step 258, the processor 70 determines whether the sign of a coefficient $h_0$ is positive. If yes, in step 260, the processor 70 decrements the value of the coefficient $h_0$ by a constant $k_3$. If the condition in step 258 is not satisfied, in step 262, the processor 70 increments the value of the coefficient $h_0$ by a constant $k_4$. The processor 70 suitably stores the newly computed value of the coefficient $h_0$ in the memory 75 to enable the processor 70 to route updated values to the appropriate register of the coefficient register 56. It is noted that when the filter 40 implements the process 250, the decay applied to the coefficients of the filter 40 is controlled by both the magnitude of the decrement and increment constants $k_3$ and $k_4$, respectively, and the magnitude of the threshold value TH.

It is to be understood that the embodiments and variations shown and described above are illustrative of the principles of this invention only and that various modifications may be implemented by those skilled in the art without departing from the scope and spirit of the invention.

What is claimed is:

1. A method for filtering a modulated signal in which the rate of frequency modulation is variable, the method comprising:
    (a) receiving a group of data samples of the modulated signal;
    (b) supplying the data samples as input to an adaptive filter;
    (c) adapting coefficients of the adaptive filter so that the filter discriminates on the basis of the rate of frequency modulation of the modulated signal.

2. A method for filtering signals according to frequency modulation rate comprising the steps of:
    sampling a received signal;
    storing data samples of the received signal in a data register;
    adapting tap coefficients of a coefficient register for filtering the received signal according to frequency modulation rate such that an undesired modulated signal is substantially attenuated and a desired modulated signal is substantially unattenuated; and,
    supplying a filtered version of the received signal as a filtered output signal.

3. The method of claim 2, wherein said adapting step provides for filtering of the received signal without utilizing data signals supplied from a reference source.

4. The method of claim 2, wherein said desired modulated signal comprises a high-frequency-modulation-rate modulated spread spectrum communication signal and said undesired modulated signal comprises a slowly modulated noise signal.

5. An adaptive filter for filtering out noise signals in a spread spectrum communication network, the filter comprising:
    an input for sampling a received signal;
    a data register for storing the data samples;
    a coefficient register including a plurality of tap coefficients, wherein said tap coefficients are updated and decayed for filtering from the received signal any slowly modulated noise signals and for generating a filtered output signal, wherein said filtered signal includes spread spectrum communication signals having a frequency modulation rate greater than the frequency modulation rate of the modulated signals filtered out.

6. A method for filtering signal components from a received signal according to frequency modulation rate, the method comprising the steps of:
    (a) receiving a group of data samples of the received signal;
    (b) multiplying each data sample of symmetrical data sample pairs of the group by a coefficient of an adaptive finite impulse response filter, said symmetrical data sample pairs being symmetrical about a center datum of the group;
    (c) summing the products of step (b) with the center datum to obtain an error signal;
    (d) determining adaptation directions of each data sample of the symmetrical data sample pairs; and,
    (e) adapting the coefficients to cause the error signal to become a filtered version of the received signal, in which signal components are filtered according to frequency modulation rate.

7. The method of claim 6, wherein step (e) further comprises the steps of:
- updating a coefficient of the filter using the error signal when each of the data samples of the symmetrical sample pair corresponding to the coefficient has the same adaptation direction; and,
- decaying the coefficients towards zero.

8. The method of claim 7, further comprising the step of:
- (f) performing steps (a) through (e) for sequential groups of data samples of the received signal.

9. The method of claim 8, wherein the steps of decaying and updating the coefficients are such that the error signal becomes a filtered version of the received signal containing signal components having frequency modulation rates greater than $2.9 \times 10^9$ Hz/second.

10. The method of claim 8, wherein the received signal includes structured spread spectrum chirp communication signal components and wherein the steps of decaying and updating the coefficients are such that the error signal becomes a filtered version of the received signal containing the structured chirp signals in substantially unattenuated form.

11. The method of claim 8, wherein said received signal comprises structured signal components having frequency modulation rates less than $2.9 \times 10^9$ Hz/second and non-structured information signal components having frequency modulation rates greater than $2.9 \times 10^9$ Hz/second, and wherein the steps of decaying and updating the coefficients are such that the error signal becomes a filtered version of the received signal comprising said non-structured information signals in substantially unattenuated form and said structured signals in substantially attenuated form.

12. The method of claim 11, further comprising the step:
- (g) correlating the error signal for extracting the information from the non-structured information signals.

13. The method of claim 8, wherein said received signal comprises structured signal components having frequency modulation rates less than $2.9 \times 10^9$ Hz/second and structured information signal components having frequency modulation rates greater than $2.9 \times 10^9$ Hz/second, and wherein the steps of decaying and updating the coefficients are such that the error signal becomes a filtered version of the received signal comprising said structured information signals in substantially unattenuated form and said structured signal components having frequency modulation rates less than $2.9 \times 10^9$ Hz/second in substantially attenuated form.

14. The method of claim 13, further comprising the step:
- (g) correlating the error signal for extracting the information from the structured information signals.

15. The method of claim 8, further comprising the steps of generating a rejected signal, said rejected signal being derived from the sum of the products of step (b) and containing substantially unattenuated signal components having frequency modulation rates less than $2.9 \times 10^9$ Hz/second and substantially attenuated signal components having frequency modulation rates greater than $2.9 \times 10^9$ Hz/second.

16. The method of claim 7, wherein steps (d) and (e) further comprise the step of performing a Sign-Sign least means squared algorithm for updating the coefficients of the filter.

17. The method of claim 6, wherein step (e) further comprises the step of symmetrically adapting the coefficients to provide for a constant group delay.

18. The method of claim 6, wherein there is a center coefficient and step (e) further comprises the step of setting the center coefficient equal to zero for avoiding complete cancellation of the received signal.

19. A communication system for filtering signal components from a received signal according to frequency modulation rate, the system comprising:
- a receiver for receiving and generating data samples of a spread spectrum signal;
- an adaptive finite impulse response filter including a processor and memory, said processor performing the operations of:
  - multiplying each data sample of symmetrical data sample pairs of a group of data samples of the received signal by respective coefficients, said symmetrical data pairs being symmetrical about a center datum of the group;
  - computing a sum of products term representative of the sum of the products of the data samples multiplied with the coefficients;
  - computing an error signal representative of the sum of the sum of products term with the center datum;
  - determining adaptation directions of each data sample of the symmetrical sample pairs;
  - updating a coefficient of the filter using the error signal when each of the data samples of the symmetrical sample pair multiplied with the respective coefficient has the same adaptation direction; and,
  - decaying the values of the coefficients towards zero, wherein the processor stores and retrieves from the memory values representative of the data samples, the coefficients, the sum of products term and the error signal, and wherein the processor updates and decays the coefficients for filtering the received signal such that a high-frequency-modulation rate modulated spread spectrum communication signal is substantially unattenuated and any slowly frequency modulated signal is substantially attenuated; and,
- a correlator for receiving the filtered version of the received signal and extracting information from the communication signal included in the filtered signal.

20. A system for filtering signal components from a received signal according to frequency modulation rate, the system comprising:
- a receiver for receiving and generating data samples of a signal;
- an adaptive finite impulse response filter including a processor and memory, said processor performing the operations of:
  - multiplying each data sample of symmetrical data sample pairs of a group of data samples of the received signal by a coefficient, said symmetrical data pairs being symmetrical about a center datum of the group;
  - computing a sum of products term representative of the sum of the products of the data samples multiplied with the coefficients;
  - computing an error signal representative of the sum of the sum of products term with the center datum;
  - determining adaptation directions of each data sample of the symmetrical sample pairs;
  - updating a coefficient of the filter using the error signal when each of the data samples of the symmetrical sample pair multiplied with the respective coefficient has the same adaptation direction; and,
  - decaying the values of the coefficients towards zero, wherein the processor stores and retrieves from the memory values representative of the data samples, the coefficients, the sum of products term and the error signal, and wherein the processor updates and decays the coefficients for filtering a modulated signal component from the received signal according to frequency modulation rate and for causing the error signal to become a filtered version of the received signal.

21. The system of claim 20, wherein the processor computes error signals and updates and decays the coefficients for sequential groups of data samples of the received signal.

22. The system of claim 21, wherein the system is a spread spectrum power line system.

23. The system of claim 22, wherein the received signal includes spread spectrum chirp communication signals, and wherein the processor updates and decays the coefficients for generating an error signal containing the chirp signals in substantially unattenuated form.

24. The system of claim 21, wherein the processor updates and decays the coefficients for generating an error signal containing signal components having frequency modulation rates greater than $2.9 \times 10^9$ Hz/second.

25. The system of claim 21, wherein said received signal comprises structured signal components having frequency modulation rates less than $2.9 \times 10^9$ Hz/second and non-structured information signal components having frequency modulation rates greater than $2.9 \times 10^9$ Hz/second, and wherein the processor updates and decays the coefficients for generating an error signal comprising said non-structured information signal components in substantially unattenuated form and said structured signal components in substantially attenuated form.

26. The system of claim 21, wherein said received signal comprises structured signal components having frequency modulation rates less than $2.9 \times 10^9$ Hz/second and structured information signal components having frequency modulation rates greater than $2.9 \times 10^9$ Hz/second, and wherein the processor updates and decays the coefficients for generating an error signal comprising said structured information signal components in substantially unattenuated form and said structured signal components in substantially attenuated form.

27. The system of claim 20, wherein the processor performs a Sign-Sign least means square algorithm for determining the adaptation directions based on the signs of the data samples of a data sample pair and for updating the coefficients.

28. An adaptive finite impulse response filter for filtering a received signal according to frequency modulation rate, said filter comprising:

means for grouping data samples of the received signal;

multiplication means for multiplying each data sample of symmetrical data sample pairs of a current group of data samples of the received signal by respective coefficients, said symmetrical data pairs being symmetrical about a center datum of the current group;

sum of products term means for computing the sum of the products of the data samples multiplied by the coefficients;

error signal generating means for computing the sum of the value computed by the sum of products means and the center datum;

adaptation direction means for determining the adaptation directions of each data sample of the symmetrical sample pairs;

updating means for updating a coefficient of the filter using the error signal generated by the error signal when each of the data samples of the symmetrical sample pair multiplied with the respective coefficient has the same adaptation direction; and, decaying means for decaying the values of the coefficients towards zero, wherein the updating means and decaying means adapt the values of the coefficients for filtering a modulated signal component from the received signal according to frequency modulation rate and for causing the error signal to become a filtered version of the received signal.

29. The filter of claim 28, wherein said received signal comprises structured signal components having frequency modulation rates less than $2.9 \times 10^9$ Hz/second and structured information signal components having frequency modulation rates greater than $2.9 \times 10^9$ Hz/second, and wherein the error signal becomes a filtered version of the received signal comprising said structured information signal in substantially unattenuated form and said signal components having frequency modulation rates less than $2.9 \times 10^9$ Hz/second in substantially attenuated form.

30. The filter of claim 28, wherein the adaptation direction means and the updating means perform a Sign-Sign least means square algorithm for determining adaptation directions based on the signs of the data samples of a data sample pair and updating the coefficients, respectively.

* * * * *

UNITED STATES PATENT AND TRADEMARK OFFICE
CERTIFICATE OF CORRECTION

PATENT NO. : 5,793,820

DATED : August 11, 1998

INVENTOR(S) : Timothy J. Vander Mey

It is certified that error appears in the above-identified patent and that said Letters Patent is hereby corrected as shown below:

Cover page, [56] References Cited, U.S. PATENT DOCUMENTS, the "Puzzo" reference, class/subclass "24/78 F" should be --324/78 F--.

Column 4, line 11, "$\delta(n)$" should be --$\epsilon(n)$--.

Column 6, line 23, "$\delta(n+1)$" should be --$\epsilon(n+1)$--.

Column 9, line 20, "ho" should be --$h_0$--.

Signed and Sealed this

Fifth Day of January, 1999

Attest:

Attesting Officer

*Acting Commissioner of Patents and Trademarks*

UNITED STATES PATENT AND TRADEMARK OFFICE
Certificate

Patent No. 5,793,820                                                                       Patented: August 11, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Timothy J. Vander Mey, Casselberry, FL; and Charles A. Miller, Fremont, CA.

Signed and Sealed this Eighth Day of May, 2001.

STEPHEN CHIN
*Supervisory Patent Examiner*
Art Unit 2634